US006929462B1

(12) United States Patent
Andrews

(10) Patent No.: US 6,929,462 B1
(45) Date of Patent: Aug. 16, 2005

(54) MOLD PART GUIDE MECHANISM

(75) Inventor: Lawrence R. Andrews, Millville, NJ (US)

(73) Assignee: Hammonton Mold Co. Inc., Williamstown, NJ (US)

( * ) Notice: Subject to any disclaimer, the term of this patent is extended or adjusted under 35 U.S.C. 154(b) by 433 days.

(21) Appl. No.: 09/707,886

(22) Filed: Nov. 8, 2000

(51) Int. Cl.$^7$ .......................... B29C 45/17; B29C 49/42
(52) U.S. Cl. ................ 425/450.1; 425/532; 425/451.9; 425/DIG. 5
(58) Field of Search ............................. 425/168, 450.1, 425/451.4, 451.9, 522, 541, DIG. 5, 532

(56) References Cited

U.S. PATENT DOCUMENTS

| | | | |
|---|---|---|---|
| 1,796,853 A | 3/1931 | McMullan | |
| 2,130,726 A | 9/1938 | Ardelt | |
| 2,358,175 A | 9/1944 | McGill | |
| 2,859,478 A | 11/1958 | Glasson | |
| 2,940,120 A | * 6/1960 | Grebowlec | ................. 425/577 |
| 2,972,790 A | 2/1961 | McGahan | |
| 3,020,595 A | 2/1962 | Szajna | |
| 3,267,184 A | 8/1966 | Nowicki et al. | |
| 3,416,766 A | 12/1968 | Miller | |
| 3,525,123 A | 8/1970 | Cines et al. | |
| 3,553,789 A | 1/1971 | Allitt | |
| 3,559,235 A | 2/1971 | Hagen | |
| 3,576,048 A | 4/1971 | Stanley | |
| 3,590,904 A | 7/1971 | Woodburn, Jr. | |
| 3,621,525 A | 11/1971 | Butcher | |
| 3,632,249 A | 1/1972 | Pearson | |
| 3,682,576 A | 8/1972 | Gross | |
| 3,734,671 A | 5/1973 | Talasz | |
| 3,753,641 A | 8/1973 | Turner et al. | |
| 3,768,948 A | 10/1973 | Horberg, Jr. et al. | |
| 3,797,979 A | 3/1974 | Greenwood | |
| 3,843,286 A | 10/1974 | Horberg, Jr. et al. | |
| 3,912,435 A | 10/1975 | Waring | |
| 4,120,636 A | 10/1978 | Appel et al. | |
| 4,266,927 A | 5/1981 | Gilbert et al. | |

(Continued)

FOREIGN PATENT DOCUMENTS

GB  2 240 300  7/1991

Primary Examiner—Benjamin L. Utech
Assistant Examiner—Emmanuel S. Luk
(74) Attorney, Agent, or Firm—Nixon & Vanderhye P.C.

(57) ABSTRACT

Disclosed is a mold for forming molded products including a guide mechanism for guiding at least one movable mold part into and out of the closed mold forming position with another mold part. In a preferred embodiment, the guide mechanism includes a mount for guiding the movable part of a mold into and out of the mold forming position with extreme precision. The guide mechanism in a preferred embodiment can be constructed of a structure fixed to a fixed mold part and a second structure sandwiching the fixed structure and movable in conjunction with the movable mold part. Bearings separate the fixed structure from the movable structure and permit movement of the mold mount into and out of the molding forming position. These bearings are preloaded by the compression of the fixed structure by two portions of the movable structure interconnected by a bolt and a preload spring. In a preferred embodiment, a cam operable with movement of a mold half and a return spring move the movable mold portion into and out of the mold forming position, respectively.

28 Claims, 5 Drawing Sheets

U.S. PATENT DOCUMENTS

| | | |
|---|---|---|
| 4,290,745 A | 9/1981 | Kontz |
| 4,327,045 A | 4/1982 | Nishikawa et al. |
| 4,352,653 A * | 10/1982 | Ott et al. .................... 425/541 |
| 4,365,950 A | 12/1982 | Harry et al. |
| 4,427,360 A | 1/1984 | Albrecht et al. |
| 4,437,825 A | 3/1984 | Harry et al. |
| 4,448,620 A | 5/1984 | Fink |
| 4,533,304 A | 8/1985 | Amano et al. |
| 4,552,526 A | 11/1985 | Hafele |
| 4,617,166 A | 10/1986 | Irwin et al. |
| 4,655,280 A | 4/1987 | Takahashi |
| 4,703,912 A | 11/1987 | Aoki |
| 4,717,525 A | 1/1988 | Iizuka et al. |
| 4,744,740 A * | 5/1988 | Kojima ....................... 425/107 |
| 4,808,366 A | 2/1989 | Kaminski et al. |
| 4,822,543 A | 4/1989 | Iizuka et al. |
| 4,871,507 A | 10/1989 | Ajmera |
| 4,889,480 A | 12/1989 | Nakamura et al. |
| 4,966,544 A | 10/1990 | Mitake |
| 4,984,980 A * | 1/1991 | Ueno ......................... 425/595 |
| 5,064,366 A | 11/1991 | Voss |
| 5,091,124 A * | 2/1992 | Zakich ....................... 264/40.1 |
| 5,208,044 A | 5/1993 | Miyata et al. |
| 5,240,402 A | 8/1993 | Ingram |
| 5,255,889 A | 10/1993 | Collette et al. |
| 5,269,669 A | 12/1993 | Ladouce |
| 5,284,432 A * | 2/1994 | Wurzer ....................... 425/195 |
| 5,411,699 A | 5/1995 | Collette et al. |
| 5,486,103 A | 1/1996 | Meiring et al. |
| 5,529,483 A * | 6/1996 | Abe et al. .................... 425/589 |
| 5,562,934 A * | 10/1996 | Langos et al. ............ 425/451.3 |
| 5,599,567 A | 2/1997 | Gellert |
| 5,635,226 A | 6/1997 | Koda et al. |
| 5,762,981 A | 6/1998 | Nitsche |
| 5,830,515 A | 11/1998 | Pleasant et al. |
| 5,930,882 A | 8/1999 | Gellert |
| 5,945,140 A | 8/1999 | Lin |
| 5,968,560 A | 10/1999 | Briere et al. |
| 5,989,471 A * | 11/1999 | Lian et al. ................ 264/271.1 |
| 6,036,469 A | 3/2000 | Allen et al. |
| 6,048,189 A | 4/2000 | Kurihara et al. |

* cited by examiner

MOLD PART GUIDE MECHANISM

BACKGROUND OF THE INVENTION

1. Field of the Invention

The present invention generally relates to multipiece molds, and specifically relates to guide mechanisms for ensuring precise placement of mold parts when in the mold forming position.

2. Brief Discussion of the Prior Art

Multipiece molds for forming molded products, and in particular injection blow molded products, are well known. Generally, a parison comprising the material to be molded and located on the end of a blow molding tube is inserted into position in a lower mold half. The upper mold half is lowered into the mold forming position and high pressure air and/or movement of the air tube results in the parison being expanded into all portions of the mold. After suitable cooling, the mold halves are separated and the blow molded product removed.

In many blow molded products, there are recessed bottoms on the molded product which make it difficult, if not impossible, to separate the mold halves without damage to the molded part. In such molds, it is generally acceptable to utilize a third mold part identified as a bottom end plug. This plug is slid into the mold forming position and, after the blow molding is complete, can be retracted so that any protrusion on the end plug (used to form the inner curvature to the bottom of the product) does not obstruct removal of or otherwise damage the product from the upper and lower mold portions.

In order to form a properly molded article, it is necessary that the edges of each of the mold portions fit precisely. Wear between mold parts would result in undesirable part lines being formed on the moulded product. Generally, the upper and lower mold halves are moved on bearinged and lubricated posts relative to one another, thereby maintaining a high degree of tolerance with respect to these mold halves and the direct and non-sliding contact between the upper and lower mold halves accounts for the general absence of wear.

However, where a bottom end plug is required, the plug is slid into and out of the mold forming position, and thus there can be sliding contact with one or both of the mold halves. Positioning of the end plug is generally accomplished by using an end plug mount which moves on lubricated sliding guide surfaces. Because of the industrial setting in which such molds are operated, the lubricated surfaces become contaminated and wear of the bottom end plug mount sliding surfaces occurs. In as few as 10 to 20 thousand mold cycles, the bottom end plug mount sliding surfaces can wear enough that the bottom end plug does not precisely fit in the mold forming position with resultant mold part lines being created in the bottom of the blow-molded product. Even if the sliding surfaces are protected by seals and/or protective boots, unacceptable wear occurs after 40 to 60 thousand cycles.

When the above described wear problem occurs, the bottom end plug, the mounting block and/or the upper and lower mold halves must be refurbished by the addition of any metal worn away and then refinishing to their original tolerances. Because refurbishment is extremely expensive, in many instances it is more cost-effective to simply replace the upper and lower mold halves along with the bottom end plug.

Thus, it is desirable to provide a mold guide structure which will precisely and accurately position moveable portions of a mold in the mold forming position and at the same time allow it to easily move into and out of the mold forming position through a large number of operating cycles.

SUMMARY OF THE INVENTION

It is therefore an object of the present invention to provide a guide mechanism to precisely position a moveable mold part such as a bottom end plug in its mold forming position with such precision that little or no sliding contact occurs between mold parts.

It is a further object of the present invention to provide a bearing supported mount with preloaded bearings to precisely position a moveable mold part to avoid sliding contact.

It is a still further object of the present invention to provide a bottom end plug guide mechanism with an operating life of greater than 1,000,000 cycles.

The above and other objects are achieved in the present invention by providing a guide structure for at least one movable mold part in which the guide structure has first and second structures. One of the structures is fixed to a movable mold part and the other structure is fixed to another mold part. The structures are arranged such that one of the structures sandwiches at least a portion of the other structure and a plurality of bearings are located between the sandwiched surfaces. The structures are further arranged such that one of the structures applies a preload pressure to the bearings in a direction normal to the mold movement direction. As a result, due to the bearing preload, the movable mold part is precisely located in position with respect to the remaining mold portions during each and every cycle. The bearings minimize wear between the first and second structure surfaces allowing a 10 to 100-fold or greater increase in the number of mold cycles without need for refurbishment.

In preferred embodiments, a mold having upper and lower halves operates in conjunction with a bottom end plug mounted on a guide structure, as discussed above. The guide structure rigidly mounts the bottom end plug for movement toward and away from the lower mold half under the influence of a cam which is a portion of the upper mold half. Thus, as the upper mold is lowered into position, the cam pushes the bottom end plug in the mold movement direction until it is precisely located in the aperture between the upper and lower mold halves. In a further preferred embodiment, where removal of the molded product is hindered by the upper portion of the bottom end plug, a split bottom end plug may be used in which the upper and lower portions of the plug are mounted respectively to the upper and lower mold halves, each by the inventive guide structure.

BRIEF DESCRIPTION OF THE DRAWINGS

The above and other objects will be more clearly appreciated by reference to the Figures appended hereto wherein.

DETAILED DESCRIPTION OF PREFERRED EMBODIMENTS

Similar components will be identified by similar reference numbers throughout the separate views.

Figure 1:
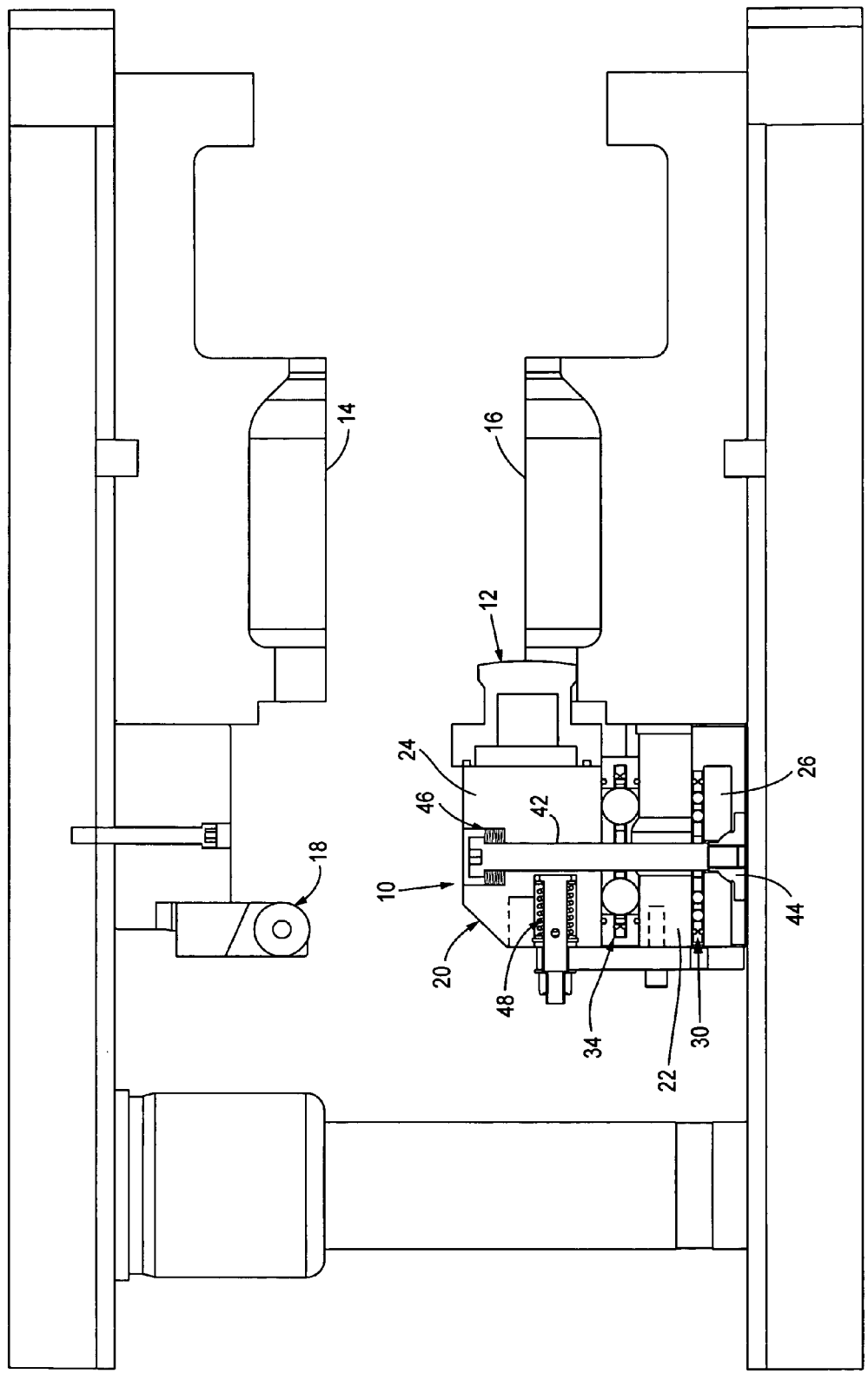
FIG. 1 is a side view partially in section of a mold for forming molded products in accordance with the present invention with the mold in the open position.
Figure 2:
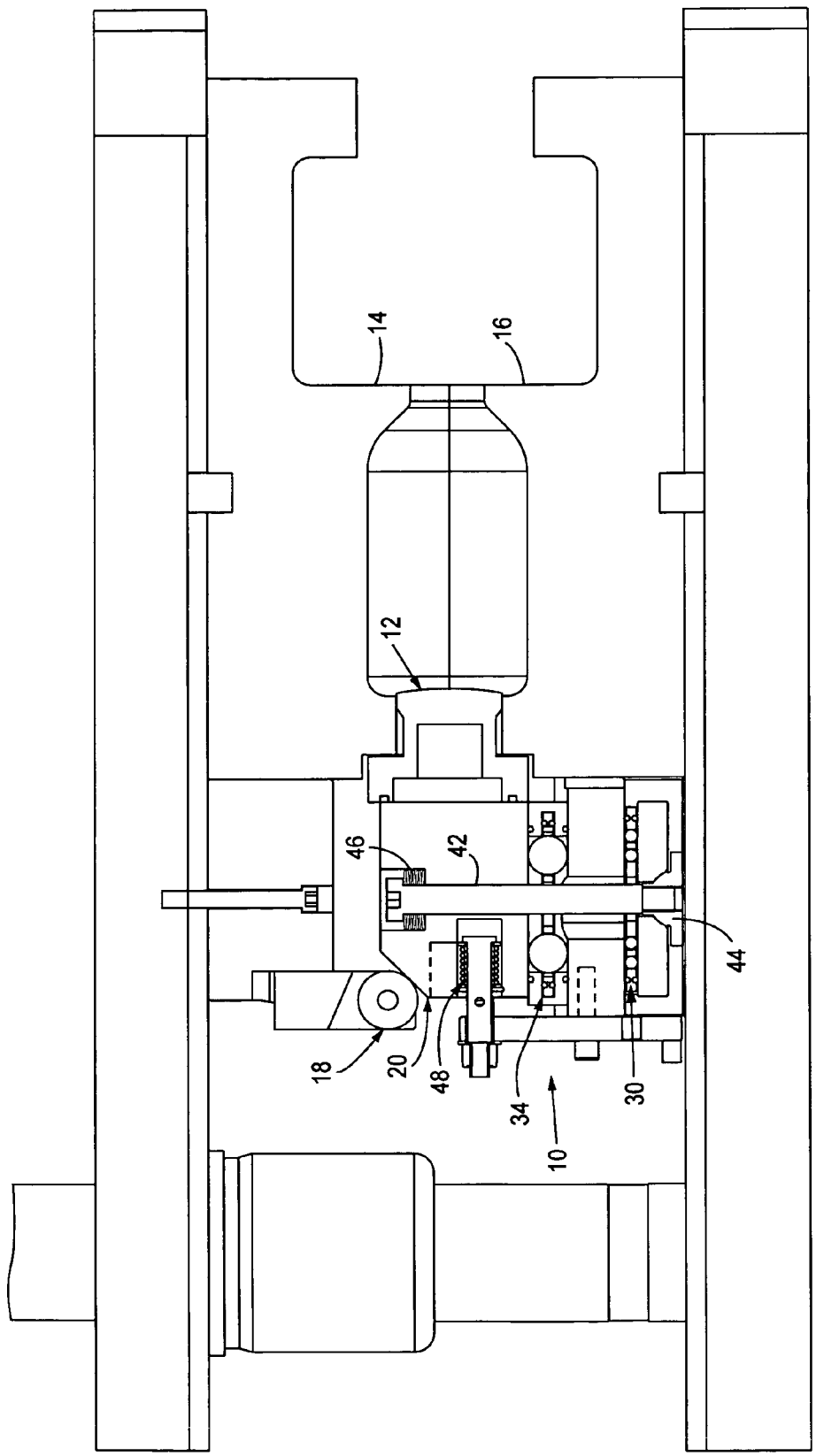
FIG. 2 is a side view partially in section of the mold shown in FIG. 1, but in the closed, mold forming position.
Figure 3:
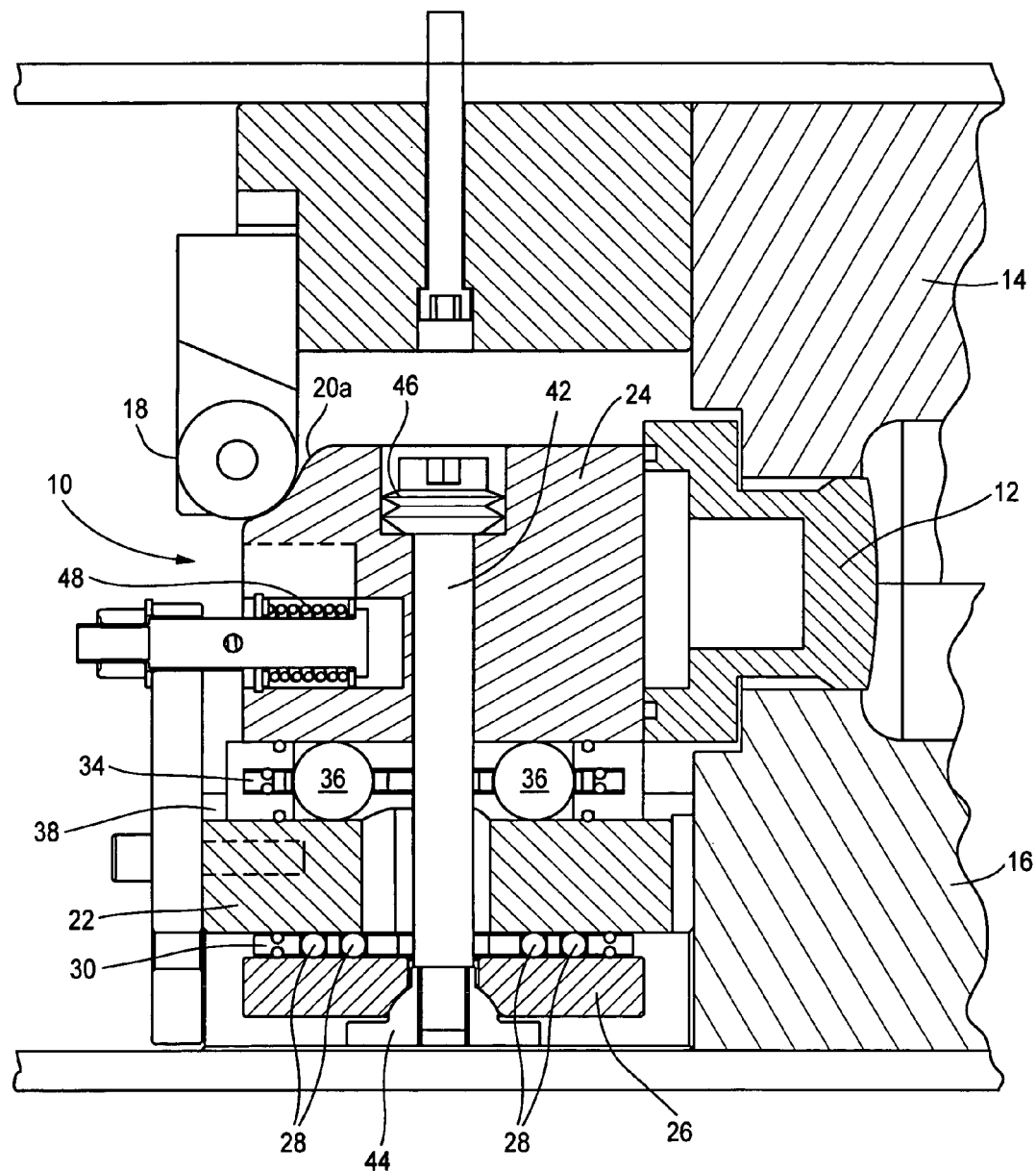
FIG. 3 is a side view partially in section of the guide structure portion of the mold shown in FIG. 2.
Figure 8:
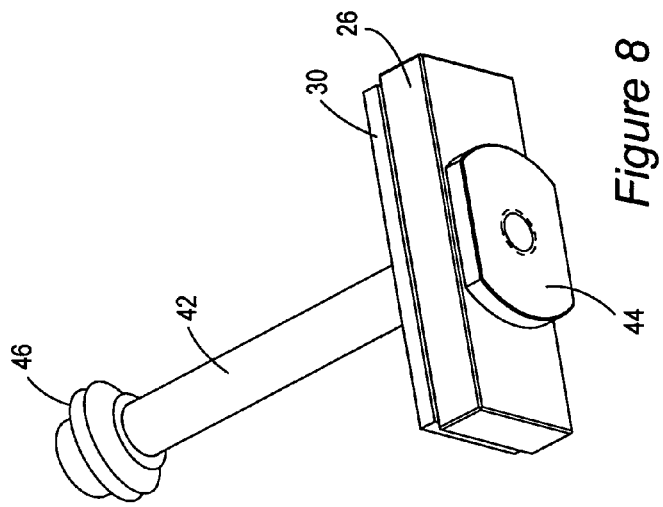
FIG. 8 is a perspective view of the bearing preload mechanism shown in FIG. 3.

FIGS. 1 and 2 illustrate a mold for forming injection blow molded products in accordance with the present invention. However, the present invention is not limited to injection blow molding molds and could also be advantageously utilized for any other molded product. The primary portions of the mold as shown in FIGS. 1 through 3 are the guide mechanism 10, the bottom end plug 12, the upper mold half 14 and the lower mold half 16. Although the illustrated embodiment shows the lower mold half 16 fixed and the upper mold half 14 vertically movable into a mold forming position shown in FIG. 2 and out of a mold forming position in FIG. 1, the lower mold half could just as easily be movable with the upper mold half fixed. In fact, both upper and lower mold halves could also be movable, although this would add undue complexity to the molding system.

It is noted that, in conjunction with the movable upper mold half 14 as illustrated, a cam roller 18 is provided which contacts cam surface 20 forcing bottom end plug 12 into the mold forming position shown in FIG. 2. While FIGS. 1 and 2 illustrate that cam surface 20 may be planar, in the FIG. 3 detailed view of the guide mechanism 10, the cam surface 20a is shown as having a curved profile. This curved profile will vary the speed at which the bottom end plug moves into the mold forming position shown in FIG. 2 with respect to the upper and lower mold halves 14 and 16, respectively.

Guide mechanism 10 is comprised of first structure 22 which, in a preferred embodiment, is fixedly connected to the lower mold half 16. Sandwiching first structure 22 is a second structure comprised of end plug mount 24 and pressure plate 26 joined by bolt 42. Separating first structure 22 and pressure plate 26 are a plurality of roller bearings 28 located in lower roller bearing cage 30 (also seen in FIGS. 6 & 7). Separating the first structure 22 from end plug mount 24 are a plurality of roller bearings 32 and located in upper roller bearing cage 34 (seen in FIGS. 4 & 5).

Also located in upper roller bearing cage 34 are at least two guide balls 36. These guide balls fit into a guide ball race 38 machined into the upper surface of first structure 22 and a corresponding guide ball race 40 machined into the lower surface of end plug mount 24. It can be seen that while roller bearings 32 separate first structure 22 from end plug mount 24, the guide balls 36 ensure that relative movement of the end plug mount 24 and thus bottom end plug 12 is along a desired mold movement path into a mold forming position shown in FIG. 2 and out of a mold forming position shown in FIG. 1.

Although the mold movement path in preferred embodiments is a linear mold movement direction, the path in other embodiments could be curved should a changing vertical position or orientation of the bottom end plug 12 be desirable. In the event a curved path was desirable, the guide ball races 38 and 40 would be similarly curved. Additionally, the lower surface of end plug mount 24 and upper surface of first structure 22 would also have to be curved to facilitate relative movement of the roller bearings 28 therebetween. Similarly, the lower surface of first structure 22 and upper surface of pressure plate 26 would also have to be curved to facilitate the desired curved motion and to permit movement of the roller bearings 28 therebetween.

An important aspect of the present invention is the fact that the elements are arranged such that the roller bearings (and possibly guide balls) are preloaded in order to eliminate any tolerances or tolerance build-up so as to achieve precise location of the end plug 12 in the mold forming position. In the embodiment shown in FIGS. 1–3, this preloading is accomplished by the bolt 42, shown as a shoulder bolt, which is threaded into swivel nut 44 which in a preferred embodiment has a hemispherical head which cooperates with a hemispherical aperture in pressure plate 26. Because of the cooperating hemispherical shapes, the pressure applied by the swivel nut 44 to the pressure plate is uniform over the pressure plate and thus the preload compression on the plurality of lower roller bearings 28, as well as upper roller bearings 32, can be relatively uniform.

The inclusion of a strong spring under the head of bolt 42, such as belleville springs 46, serve to provide the desired preloading to the bearings by sandwiching the first structure between the pressure plate 26 and end plug mount 24. In a preferred embodiment, a preload on the order of 80 lbs. has been found appropriate. However, depending upon the bearings and the components, different preload pressures could be used.

As previously discussed, the cooperation between cam roller 18 and cam surface 20 (or curved cam surface 20a) moves the end plug mount 24, and bottom end plug 12 mounted thereon, into the mold forming position (wherein the parts of the mold are closed actually forming a mold). The guide mechanism 10 also includes a return spring 48 which serves to bias the end plug mount 24 to the left as shown in FIGS. 1–3. The operation of the cam roller against the cam surface 20 (or 20a) when the upper mold half 14 descends toward the mold forming position (shown in FIG. 2) overcomes the bias of return spring 48, allowing the bottom end plug 12 to be moved into proper position relative the upper and lower mold halves. When the pressure of cam roller 18 against the cam surface 20 (or 20a) is withdrawn as the upper mold half 14 is moved away from the mold forming position, the return spring withdraws the bottom end plug 12 from its mold forming position to the mold open position.

Given that pressure plate 26 and end plug mount 24 are both connected together by bolt 42 and biased toward one another by belleville springs 46, they clearly move together in contact with the bearings and the cooperating bearing surfaces on first structure 22. It would be desirable to prevent dirt and other contaminants from contacting the bearings or the bearing surfaces.

Figure 5:
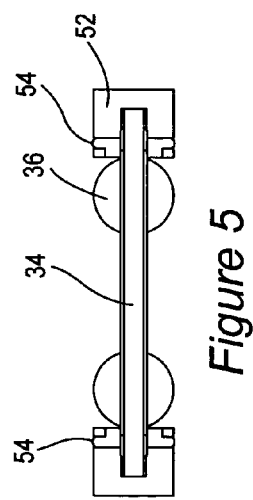
FIG. 5 is a side view of the upper bearing cage shown in FIG. 3.
Figure 4:
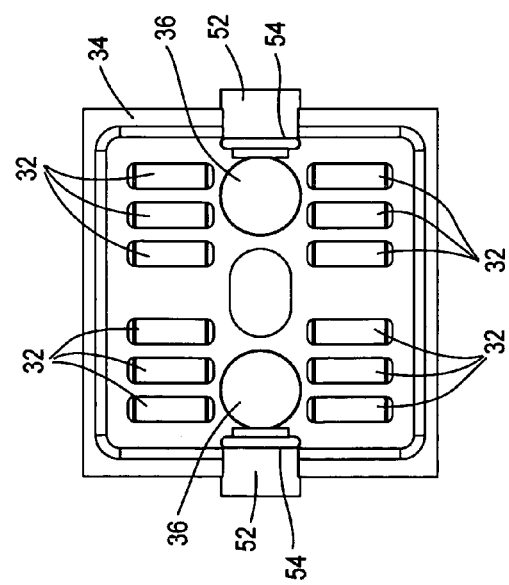
FIG. 4 is a top view of the upper bearing cage shown in FIG. 3.

The details of the upper bearing cage 34 can be seen in FIGS. 4 and 5. While the upper bearing cage 34 maintains the relative position of the roller bearings 32 and the guide balls 36, it also serves to mount a peripheral o-ring seal 50 which effectively seals the space between the lower surface of end plug mount 24 and the flat upper surface of fixed structure 22. Either a single seal could be used or in the preferred embodiment separate seals on the top and bottom of the cage 34 are provided. Guide race plugs 52, sized to fit the space between the guide ball races 38 and 40, also have smaller o-ring seals 54 which serve to seal the space in front of and behind the guide balls 36.

Figure 7:
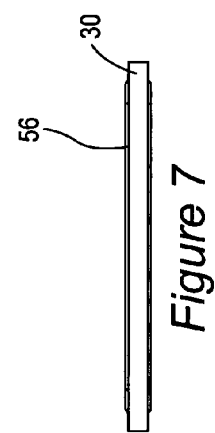
FIG. 7 is a side view of the lower bearing cage shown in FIG. 3.
Figure 6:
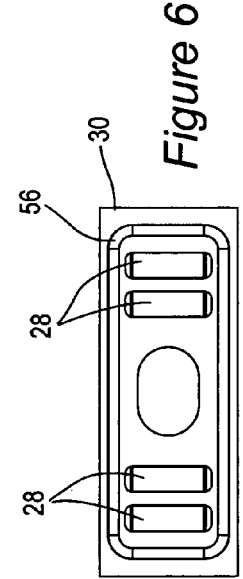
FIG. 6 is a top view of the lower bearing cage shown in FIG. 3.

In a manner similar to upper roller bearing cage 34, lower cage 30 is shown in detail in FIGS. 6 and 7. The lower cage 30 includes a peripheral o-ring seal 56 (preferably on the top and bottom of the cage) which effectively seals the upper surface of pressure plate 26 with the lower surface of the first structure 22. While the preferred embodiment illustrates guide balls 36 being located in guide ball races 38 & 40 formed in the end plug mount 24 and in the first structure 22, respectively, such guide balls could also be located in races created in the lower surface of first structure 22 and the upper surface of pressure plate 26. In fact, guide balls could be included in both surfaces if a very high degree of accuracy is desired.

Figure 9:
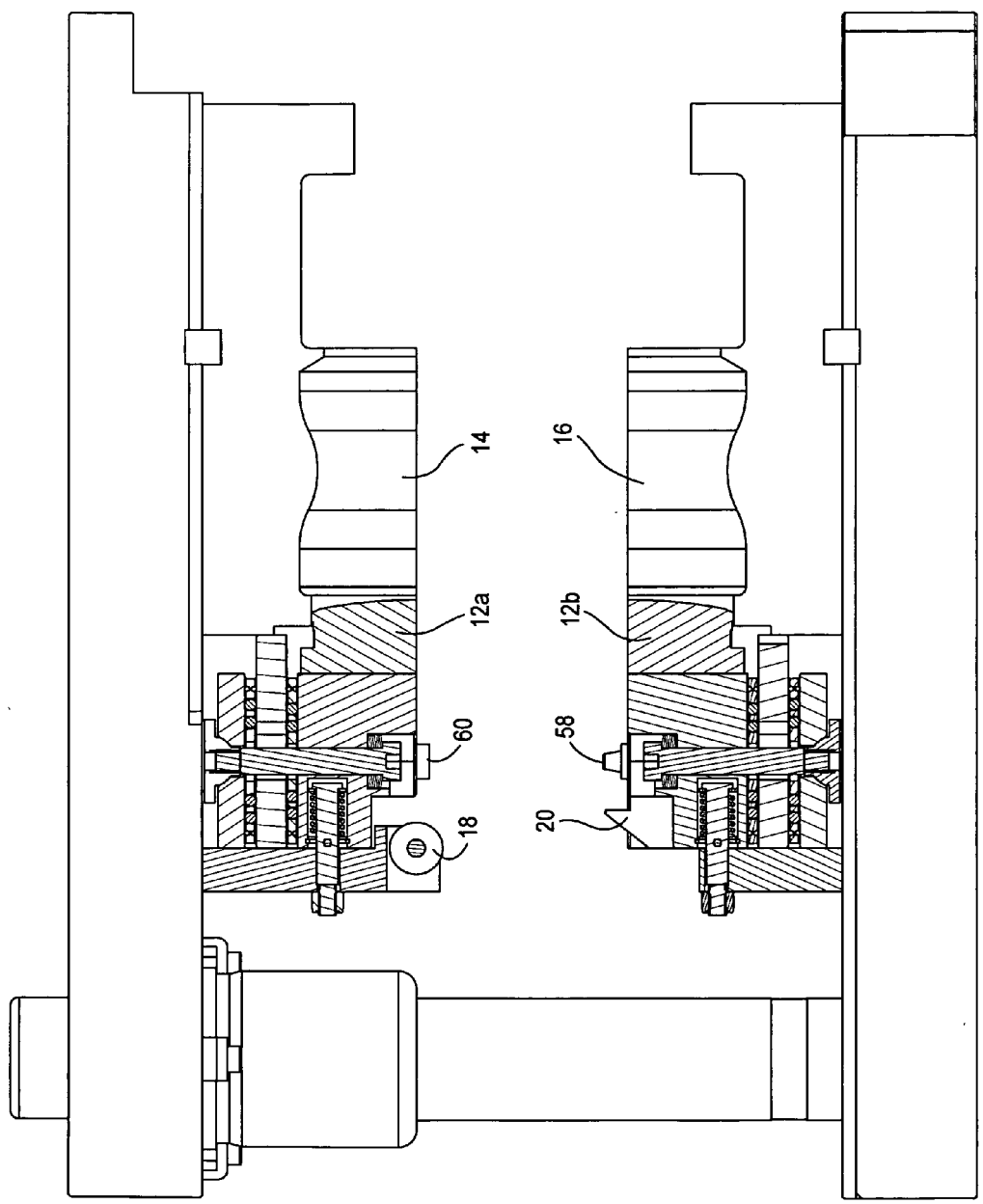
FIG. 9 is a side view partially in section of a split bottom plug.

FIG. 9 illustrates the embodiment in which the bottom end plug 12 is split into an upper portion 12a and a lower portion 12b, each of which are movable with respect to the other and with respect to their corresponding upper and lower mold halves 14 and 16, respectively. Each end plug portion has an associated guide mechanism similar to the guide mechanism illustrated in FIGS. 1–3. The lower portion 12b has a tab 58 which fits into receptacle 60 in the upper portion 12a as the mold is closed. The receptacle and/or the tab can include a bushing to reduce friction forces and wear when the tab moves into the receptacle. The tab engages the receptacle as the portions come together but before the cam roller 18 begins to press against the cam surface 20 (or 20a). As a result, when the cam roller 18 does contact the cam surface 20 (or 20a), it moves both the upper portion 12a and the lower portion 12b move together in the mold movement direction into position in the mold. In a preferred embodiment, both the tab 58 and the receptacle 60 are spring biased towards the position shown, such that if misalignment does occur and the tab 58 contacts the side of receptacle 60 during movement of the upper and lower portions toward each other, the tab and receptacle will retract into the upper and lower portions, respectively, without damaging either structure.

The use of a split bottom plug is particularly advantageous where the bottom of a blow molded article is highly concave and the bottom end plug protrudes significantly into the molded article. When the single bottom end plug is withdrawn from the mold forming position and the mold has been opened, the bottom of the blow molded product upon removal may contact the protruding portion of the bottom end plug.

In view of the above description, many variations and modifications of the present invention will be apparent to those of ordinary skill in the mold art. For example, many different types of bearings and/or bearing races could be used depending upon different design features. The movement of the end plug into and out of the mold forming position could be controlled independently of or in synchronization with the movement of the other mold parts. Thus the present invention is limited only by the scope of the claims appended hereto.

What is claimed is:

1. A mold for forming molded products, said mold comprising:
   at least two mold parts, at least one of said at least two mold parts moveable along a mold movement path with respect to the other of said at least two mold parts; and
   a guide mechanism for guiding said at least one moveable mold part into and out of a mold forming position along said mold movement path in conjunction with the at least one other mold part, wherein said guide mechanism comprises:
      a first structure fixed to said at least one other mold part;
      a second structure fixed to said at least one moveable mold part, wherein one of said first and second structures sandwiches at least a portion of the other of said first and second structures; and
      a plurality of bearings separating said first and second structures and permitting movement along said mold movement path wherein said one of said first and second structures applies a preload pressure to said bearings in at least one direction normal to said mold movement path.

2. The mold according to claim 1, wherein said mold movement path is a linear mold movement direction.

3. The mold according to claim 1, further including a means for moving said at least one moveable mold part into said mold forming position.

4. The mold according to claim 1, further including a means for returning said at least one moveable mold part away from said mold forming position.

5. The mold according to claim 3, wherein said mold includes an additional moving structure and said means for moving comprises a cam surface in conjunction with said at least one moveable mold part, said cam surface contacted by said moving structure and biasing said at least one moveable mold part into said mold forming position.

6. The mold according to claim 4, wherein said means for returning comprises a return spring biasing said at least one moveable mold part out of said mold forming position.

7. The mold according to claim 5, wherein said cam surface is planar.

8. The mold according to claim 5, wherein said cam surface is curved.

9. The mold according to claim 1, wherein said at least one other mold part is fixed and said first structure is fixed to said fixed mold part.

10. The mold according to claim 9, wherein said first structure is sandwiched between portions of said second structure.

11. The mold according to claim 2, wherein said plurality of bearing limit movement of said moveable mold part only to movement along said mold movement direction.

12. The mold according to claim 2, wherein a portion of said plurality of bearings are comprised of ball bearings and said first and second structures have at least two opposing surfaces into which corresponding ball bearing races are formed, said races extending in said mold movement direction.

13. The mold according to claim 1, wherein said mold comprises three mold parts, a top half, a bottom half and an end plug, wherein said at least one moveable mold part comprises said bottom end plug.

14. A mold for forming molded products, said mold comprising:
   at least three mold parts, at least one of said at least three mold parts moveable along a mold movement direction with respect to at least one of the others of said at least three mold parts;
   a guide mechanism for guiding said at least one moveable mold part into and out of a mold forming position along said mold movement direction in conjunction with the at least two other mold parts, wherein said guide mechanism comprises:
      a first structure fixed to one of said at least two other mold parts;
      a second structure fixed to said at least one moveable mold part, wherein one of said first and second structures sandwiches at least a portion of the other of said first and second structures; and a plurality of bearings separating said first and second structures and permitting movement in said mold movement direction;

at least one spring applying a preload pressure to said bearings in at least one direction normal to said mold movement direction:

a return spring for biasing said at least one moveable mold part in one of said directions towards and away from said mold forming position; and a cam for moving said at least one moveable mold part, in opposition to said return spring bias, to the other of said directions away from or towards said mold forming position.

15. The mold according to claim 14, wherein said mold is an injection blow molding mold.

16. The mold according to claim 14, wherein said moveable mold part is a bottom end plug for an injection blow molded mold and said others of said at least three mold parts comprise a moveable upper mold half and a fixed lower mold half.

17. The mold according to claim 14, wherein said guide structure is comprised of upper and lower bearing races, each of said bearing races formed by surfaces in each of said first and second structures, said bearing race surfaces sandwiching respective bearings.

18. A mold for forming injection molded products, said mold comprising:

a lower mold half;

an upper mold half, one of said upper and lower mold halves moveable with respect to the other of said upper and lower mold halves;

a moveable bottom end plug moveable along a mold movement direction with respect to at least one of said upper mold half and said lower mold half;

a guide mechanism for guiding said bottom end plug into and out of a mold forming position along said mold movement direction in conjunction with the upper and lower mold halves, wherein said guide mechanism comprises:

a first structure fixed to one of said upper and lower mold halves;

a second structure fixed to said bottom end plug, wherein one of said first and second structures has two portions, said two portions sandwiches at least one portion of the other of said first and second structures; and a plurality of bearings separating said first and second structures and permitting movement of said bottom end plug in said mold movement direction; and at least one spring applying a preload pressure to said bearings in at least one direction normal to said mold movement direction:

a return spring for biasing said bottom end plug in one of said directions towards and away from said mold forming position; and a cam, operated in response to movement of one of said upper and lower mold halves, for moving said at least one moveable mold part, in opposition to said return spring bias, to the other of said directions away from or towards said mold forming position.

19. The mold according to claim 18, wherein said lower mold half is fixed and said upper mold half and said bottom end plug move relative to said lower mold half.

20. The mold according to claim 18, wherein said first structure is fixed to said lower mold half.

21. The mold according to claim 18, wherein said second structure sandwiches said first structure.

22. The mold according to claim 21, wherein said first structure has upper and lower surfaces, said second structure has surfaces opposing said first structure surfaces and, said plurality of bearings are interposed between said first structure surfaces and the opposing surfaces of said second structure.

23. The mold according to claim 22, wherein said plurality of bearings includes roller bearings between said first structure lower surface and the opposing lower surface of said second structure and ball bearings between said first structure upper surface and said opposing upper surface of said second structure.

24. The mold according to claim 23, wherein said ball bearings move in ball bearing races, one race in said first structure upper surface and one race in said opposing upper surface of said second structure.

25. The mold according to claim 24, wherein said ball bearing are constrained against relative translational movement by a ball bearing cage and said roller bearings are constrained against relative translational movement by a roller bearing cage.

26. The mold according to claim 25, wherein each of said cages includes an o-ring seal in contact with at least one of said first structure surfaces and said second structure surfaces.

27. The mold according to claim 18, wherein said at least two portions are relatively moveable towards and away from each other, and said spring applying a preload pressure to said bearings, forces said portions toward each other sandwiching said at least one portion and said bearings therebetween.

28. A mold for forming molded products, said mold comprising:

a lower mold half;

an upper mold half, one of said upper and lower mold halves moveable with respect to the other of said upper and lower mold halves;

a split bottom end plug having separate upper and lower portions moveable with respect to each other, said upper and lower portions moveable along respective mold movement directions toward said upper mold half and said lower portion, respectively;

each of said upper and lower end plug portions having a guide mechanism, said guide mechanism for guiding a respective bottom end plug portion into and out of a mold forming position along said respective mold movement directions in conjunction with the upper and lower mold halves, wherein each said guide mechanism comprises:

a first structure fixed to said corresponding mold half;

a second structure fixed to said corresponding bottom end plug portion, wherein one of said first and second structures has two portions, said two portions sandwiches at least one portion of the other of said first and second structures; and a plurality of bearings separating said first and second structures and permitting movement of said corresponding bottom end plug portion in said respective mold movement directions; and at least one spring applying a preload pressure to said bearings in at least one direction normal to said respective mold movement direction:

a return spring for biasing said corresponding bottom end plug portion in one of said directions towards and away from said mold forming position; and one of a tab and receptacle on said upper portion for engagement with a corresponding one of a receptacle and tab on said lower portion, said engagement occurring prior to meeting of said portions during closure of said mold halves; and a cam, operated in response to movement of one of said upper and lower mold halves and after said tab engages with said receptacle, for moving said corresponding bottom end plug portion, in opposition to said return spring bias, to the other of said directions away from or towards said mold forming position.

* * * * *